Figure 1:
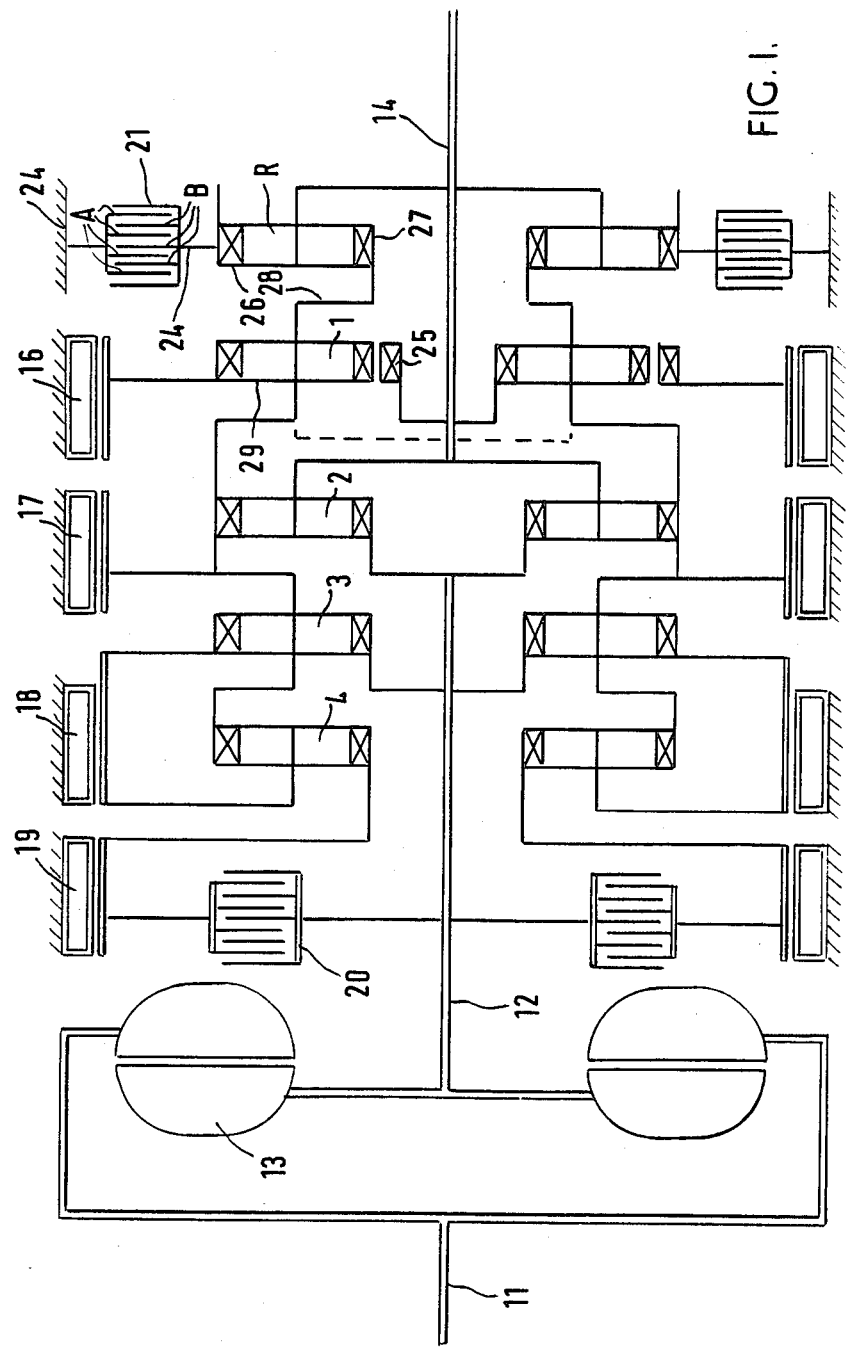

United States Patent [19]

Burnett et al.

[11] 4,276,972
[45] Jul. 7, 1981

[54] METHOD OF, AND APPARATUS FOR, RETARDING THE MOTION OF A POWER DRIVEN VEHICLE

[75] Inventors: Stanley F. Burnett, Leyland; Michael Dunkley, LongridgeW.; Raymond M. Grimes, Charnock Richard; Keith Parmee, Leyland, all of England

[73] Assignee: British Leyland UK Limited, London, England

[21] Appl. No.: 865,586

[22] Filed: Dec. 29, 1977

[51] Int. Cl.³ .................. B60K 41/26; F16D 67/00
[52] U.S. Cl. .................................................. 192/4 C
[58] Field of Search ............ 192/4 A, 4 C, 4 R, 12 C, 192/13 R; 74/DIG. 1

[56] References Cited

U.S. PATENT DOCUMENTS

| 2,679,768 | 1/1954 | Baule | 74/DIG. 1 |
|---|---|---|---|
| 2,781,879 | 2/1957 | Ebersold | 192/4 R |
| 2,846,901 | 8/1958 | Baule | 192/4 A |
| 2,872,000 | 2/1959 | Herndon et al. | 192/4 A |
| 2,912,874 | 11/1959 | Quistgaard et al. | 192/4 A |
| 3,038,574 | 6/1962 | Roche | 192/4 A |
| 3,631,950 | 1/1972 | Tanaka | 192/4 A |
| 3,651,904 | 3/1972 | Snoy | 192/4 A |
| 3,994,374 | 11/1976 | Gill | 192/4 A |
| 4,093,051 | 6/1978 | Kreitzberg | 192/4 A X |

*Primary Examiner*—George H. Krizmanich
*Attorney, Agent, or Firm*—Brisebois & Kruger

[57] ABSTRACT

A method of, and apparatus for, retarding a vehicle equipped with an epicyclic gearbox in which a reverse gear train is included. In normal operation to engage reverse gear the reverse gear train contains a reaction member which is clamped to reverse the direction of rotation of the gearbox output shaft. To provide for retardation the reverse gear reaction member is not clamped but the clamping means is operated to allow slipping or intermittent operation of the reverse gear train so providing a retarded but not reversed operation of the output shaft.

6 Claims, 2 Drawing Figures

METHOD OF, AND APPARATUS FOR, RETARDING THE MOTION OF A POWER DRIVEN VEHICLE

This invention relates to a method of, and apparatus for, retarding the motion of a power driven vehicle. Such a vehicle is one in which a prime mover is linked by an input shaft to a transmission system which, by means of an output shaft, supplies power to ground engaging wheels or tracks. In particular it is concerned with a vehicle having a transmission utilising a sequence of epicyclic gear trains each train being operable to link the input and output shaft to provide the desired relative potential speed difference. Each of the trains incorporate a reaction member whose motion can be clamped by an associated clamping means to bring the train into operation. In addition one train, the reverse gear train, is so adapted that, on clamping it, the output shaft is caused to rotate in the opposite direction to its direction of rotation when any other gear train is engaged. Hereafter such a transmission is termed as being of the type described.

According to a first aspect of the present invention there is provided a method of retarding a vehicle equipped with a transmission of the type described comprising the step of causing the clamping means for the reverse gear train to slip or act intermittently so as to cause a retarding torque to be applied to the output shaft by means of the reverse gear train. Preferably the clamping means for the reverse gear is cooled by a fluid subject to forced convection at least while the clamping means slips or acts intermittently.

According to a second aspect of the present invention there is provided a retarder for a vehicle in the form of a transmission system of the type described having a clamping means for the reverse gear train embodied in a brake or retarder control means for the brake to operate the brake (i) in a slipping or intermittent mode to apply retardation to the output shaft of the transmission; or (ii) in a clamping mode to cause reversal of direction of rotation of the output shaft relative to the direction of rotation with any forward gear engaged.

According to a first feature of the retarder, there is provided forced convection fluid cooling means for the brake or retarder adapted for operation at least while the brake operates in the slipping or intermittent mode.

According to a second feature of the retarder the control means are adapted to operate the brake in the slipping or intermittent mode with any one of the remaining gear trains acting to link the input shaft to the output shaft.

According to a third feature of the retarder the control means are adapted to operate the brake in the slipping or intermittent mode only when the remaining gear trains do not act to link the input shaft to the output shaft.

According to a fourth feature of the retarder of the invention there is provided a regulator so adapted that, on initial operation of the regulator, the transmission is placed in neutral and subsequent operation of the regulator causes the brake to operate in the slipping or intermittent mode.

According to a fifth preferred form of the second aspect of the invention there is provided a regulator so adapted that, on operation of the regulator, the brake operates in the slipping or intermittent mode with a clamping means of another gear train clamping a reaction member of that gear train.

According to a sixth feature of the retarder of the invention there is provided a regulator so adapted that, on initial operation of the regulator, with the transmission engaged in a gear other than reverse or lowest forward gear, the transmission is caused to change from the gear in which it is engaged to a lower gear (that is to say a change in which the number of revolutions of the output shaft by comparison with the input shaft decreases) and subsequent operation of the regulator causes the brake to operate in the slipping mode.

Figure 2:
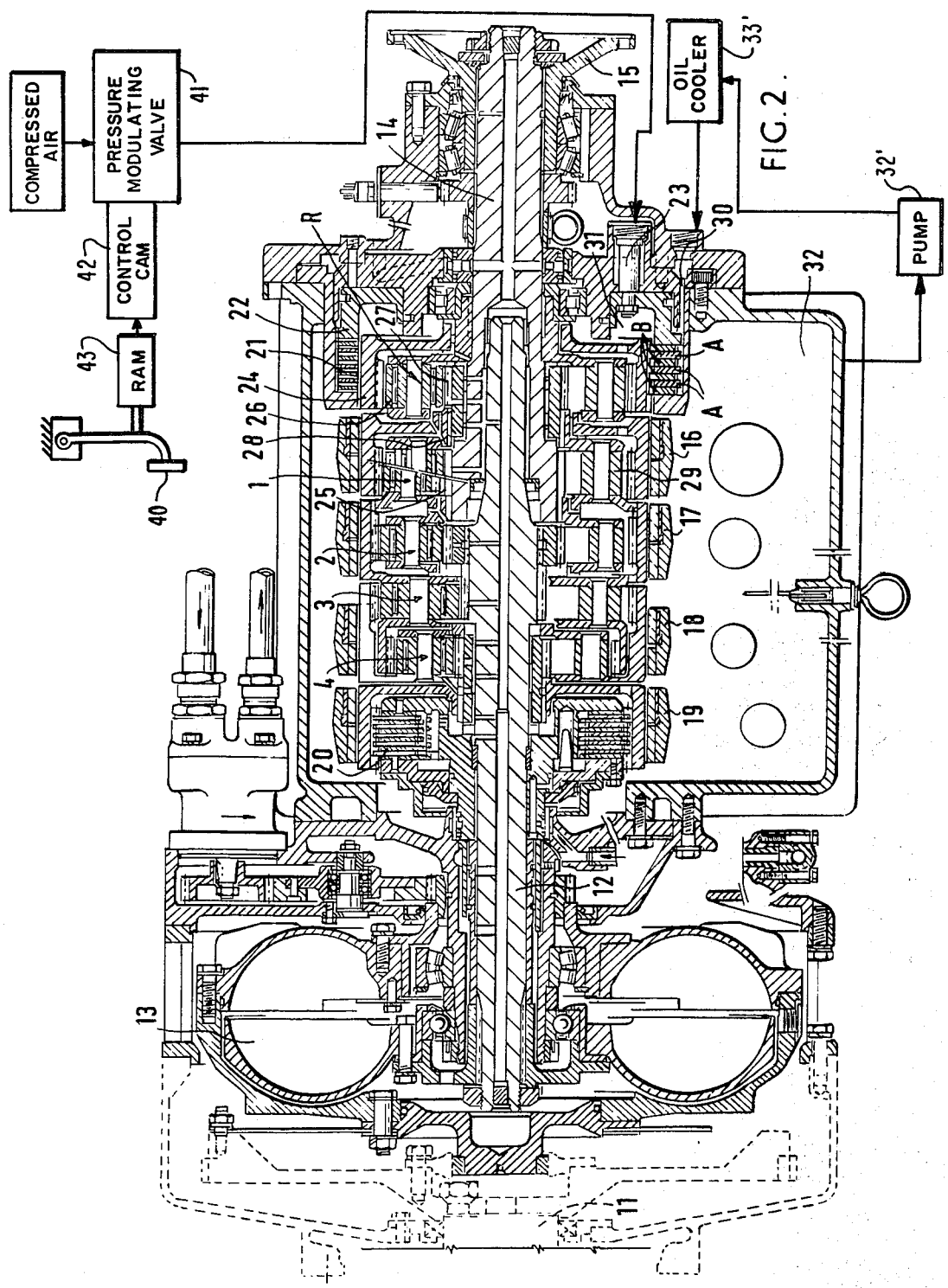

An exemplary embodiment of the invention will now be described with reference to the accompanying drawing of which:

FIG. 1 is a diagram of the significant components of a transmission unit for a road vehicle; and FIG. 2 is a sectional elevation of the transmission shown diagrammatically in FIG. 1.

Similar components in both Figures have similar reference numerals.

Power from a diesel engine is fed to input shaft 11. Intermediate shaft 12 is coupled to input shaft 11 by a fluid coupling 13. Output shaft 14 has splined to it a flange 15 for coupling to a drive shaft for a differential gearing for the rear wheels of the vehicle.

To enable the speed of output shaft 14 to be varied relative to the speed of input shaft 11 the shafts 12, 14 can be coupled to one another by epicyclic gear trains 1 to 4 and R.

The selection of the appropriate speed is achieved by operation of: compressed air operated band brakes 16 to 19 associated, respectively, with gear trains 1 to 4; clutch 20; and, in the case of a reverse speed, brake or retarder 21.

Forward Gears

If the lowest forward gear described as first is provided by operation of gear train 1 and the highest forward gear, described as fifth, is provided by gear train 4 then the requisite brake or clutch engagement is indicated by E as follows:

| Gear | Clutch | Band Brake | | | | |
| | | 20 | 19 | 18 | 17 | 16 |
|---|---|---|---|---|---|---|
| First | | | | | | E |
| Second | | | | | E | |
| Third | | | | E | | |
| Fourth | | | E | | | |
| Fifth | E | | | | | |

Reverse Gear

Clutch 21 comprises interleaved plates A, B of sintered carbon material. Plates A are carried on brake or retarder member 22 which is displaceable by hydraulically operated ram 23. Plates B engage reaction member 24 of a gear train R. Full pressurisation of ram 23 causes closing up of plates A, B to lock up reaction member 24 to member 22. Output shaft 14 is caused to rotate by transmission through sun wheels 25 from coupling 13. The direction of rotation is governed by the connection between planet wheel 26, sun wheel 27, carrier 28, planet wheels 29 and the sun wheel 25.

An alternative mode of operation is provided for brake 21 to enable retardation or braking to be applied to output shaft 14. In this mode the reaction member 24 is not locked up but allowed to slip or engage intermittently in a controlled manner. To cool the sintered plates A, B a continued flow of oil is directed through brake 21 from duct 30. From duct 30 oil flows inwardly across the plates A, B to annular chamber 31 and into the gear box sump 32. From the sump the oil is withdrawn by a pump 32' and passed through an oil cooler 33' back to duct 30. For this purpose a low pressure oil pump is sufficient. A separate high pressure system is provided for control and other services.

The control system for operating brake 21 in a slipping mode is regulated by a foot brake pedal 40 of the vehicle. A pressure modulating valve 41 controls the fluid pressure applied to the ram 23. The valve position is controlled by a cam 42 operated by a slave and master hydraulic ram 43 from movement of the brake pedal 40. The cam enables a degree of flexibility in the relationship between pedal travel and hydraulic pressure to allow operation of the retarder to be integrated effectively with the braking system of the vehicle.

On the first part of brake pedal travel only a variable pressure will be applied to ram 23. The response time is short so use of the retarder is rapidly available. Further depression of the brake pedal causes the vehicle foundation brake to be applied. With increasing depression the brakes and retarder will be operative but the retarder is modulated so as not to impair vehicle stability.

In normal usage three alternative sequences of gear box operation on applying retardation is envisaged.

In the first sequence initial operation of the foot pedal causes the gearbox to be placed in neutral prior to engagement of the slipping mode of operation with brake 21.

In the second sequence the initial placing of the gearbox in neutral of the first sequence is disposed with and operation of the footbrake immediately causes the slipping mode of operation of brake 21.

In the third sequence operation of the footbrake causes the transmission to change down one gear (if possible) automatically prior to engagement of the slipping mode of operation of brake 21.

We claim:

1. In a method of retarding a vehicle, equipped with a transmission utilising a sequence of epicyclic gear trains, each train being operable to link the input and output shaft to provide the desired relative potential speed difference: each of the trains incorporating a reaction member whose motion can be clamped by an associated clamping means to bring the train into operation and having in addition a reverse gear train whose motion can be clamped by an associated clamping means to cause the output shaft to rotate in the opposite direction to its direction of rotation when any other gear train is engaged; the improvement comprising the step of causing the clamping means for the reverse gear train to slip or act intermittently so as to cause a retarding torque to be applied to the output shaft by means of the reverse gear train.

2. A method of retarding a vehicle as claimed in claim 1 further comprises cooling the clamping means for the reverse gear with a fluid subject to forced convection at least while the clamping means slips or acts intermittently.

3. A retarder for a vehicle in the form of a transmission system utilising a sequence of epicyclic gear trains each train being operable to link the input and output shaft to provide the desired relative potential speed difference; each of the trains incorporating a reaction member whose motion can be clamped by an associated clamping means to bring the train into operation and in addition a reverse gear train so adapted that, on clamping it, the output shaft is caused to rotate in the opposite direction to its direction of rotation when any other gear train is engaged; characterised by clamping means for the reverse gear train embodied in a brake and a control means for the brake to operate the brake
   (i) in a slipping or intermittent mode to apply retardation to the output shaft of the transmission; and
   (ii) in a clamping mode to cause reversal of direction of rotation of the output shaft relative to the direction of rotation with any forward gear engaged.

4. A retarder as claimed in claim 3 further comprising forced convection fluid cooling means for the brake for cooling the brake at least while the brake operates in the slipping or intermittent mode.

5. A retarder as claimed in claim 3 wherein the control means operate the brake in the slipping or intermittent mode with any one of the remaining gear trains acting to link the input shaft to the output shaft.

6. A retarder as claimed in claim 3 wherein the control means operate the brake in the slipping or intermittent mode only when the remaining gear trains do not act to link the input shaft to the output shaft.

* * * * *